United States Patent
Ohkado

(10) Patent No.: US 6,351,613 B2
(45) Date of Patent: *Feb. 26, 2002

(54) CAMERA HAVING SELECTIVE INFORMATION RECORDING FACILITY

(75) Inventor: Teruyuki Ohkado, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/273,389

(22) Filed: Mar. 22, 1999

(30) Foreign Application Priority Data

Mar. 31, 1998 (JP) ............................................ 10-101735

(51) Int. Cl.7 .............................. G03B 7/26; G03B 17/24
(52) U.S. Cl. ......................... 396/303; 396/310; 396/429
(58) Field of Search .......................... 396/50, 310, 315, 396/319, 429, 301, 302, 303, 265

(56) References Cited

U.S. PATENT DOCUMENTS

| | | | | |
|---|---|---|---|---|
| 5,296,884 A | * | 3/1994 | Honda et al. | 396/311 |
| 5,506,644 A | * | 4/1996 | Suzuki et al. | 396/319 |
| 5,543,872 A | * | 8/1996 | Goto et al. | 396/310 |
| 5,671,451 A | * | 9/1997 | Takahashi et al. | 396/310 |
| 5,768,640 A | * | 6/1998 | Takahashi et al. | 396/310 |
| 5,913,078 A | * | 6/1999 | Kimura et al. | 396/50 |
| 6,181,878 B1 | * | 1/2001 | Honda | 396/310 |

* cited by examiner

Primary Examiner—David M. Gray
(74) Attorney, Agent, or Firm—Robin, Blecker & Daley

(57) ABSTRACT

A camera includes a receiving device capable of receiving a signal externally transferred, a recording device for recording, on a recording medium, information related to the signal received by said receiving device, and a control circuit which inhibits signal-receiving of the receiving device during a predetermined period of time from the preceding reception of the signal by the receiving device.

7 Claims, 4 Drawing Sheets

CAMERA HAVING SELECTIVE INFORMATION RECORDING FACILITY

BACKGROUND OF THE INVENTION

1. Field of the Invention

The present invention relates to a camera which is capable of recording, on a recording medium, image information, signal-received information, etc.

2. Description of Related Art

There has been already generally known a technical art of providing a film with a magnetic recording part and recording or reproducing, on or from the magnetic recording part, film information and camera-photo-taking information. Also, the so-called digital camera, which records or reproduces, on or from a memory, image information or photo-taking information, has come into popular use.

Further, there have been recently proposed a variety of technical arts in which the camera is capable of obtaining positioning (measured-position) information or bearing (measured-direction) information and recording such information together with a photo-taken image on a recording medium. In the above technical arts, the positioning information or bearing information is made to be obtained by receiving GPS (Global Positioning System) information, as disclosed in Japanese Laid-Open Patent Application No. Hei 6-67282, etc. The GPS information is information produced by a GPS receiving apparatus (an apparatus for receiving radio waves from artificial satellites) which is equipped with a camera. Absolute-position information such as the positioning information or bearing information can be obtained from the GPS information in the above-mentioned manner.

The GPS information sometimes becomes difficult to receive, for example, in a tunnel or in a room in the basement. If a photo-taking operation is performed in such a situation with the positioning information or bearing information intended to be recorded, information received in the preceding photo-taking operation is made to be recorded, in the above-mentioned Japanese Laid-Open Patent Application No. Hei 6-67282.

Further, as disclosed in Japanese Laid-Open Patent Application No. Hei 9-127593, Japanese Laid-Open Patent Application No. Hei 9-127594, Japanese Laid-Open Patent Application No. Hei 9-127595, etc., the reliability of the positioning information or bearing information is made to increase by detecting the reliability of the positioning information or bearing information or by enabling a manual input of information when the GPS information is difficult to receive for a predetermined period of time.

However, in a case where a certain instant scene is intended to be continuously taken by the camera (for example, in the case of continuous shooting), if the signal-receiving state or reliability of the GPS information is detected at the time of every photo-taking operation, as in the above-described conventional example, there is a possibility that a photo-taking operation becomes impossible during a period of time required for such detection.

Further, the detection of the signal-receiving state or reliability of the GPS information, as in the conventional example, necessitates keeping a power supply of the GPS receiving apparatus always in an on-state, so that wasteful electric energy would be consumed.

BRIEF SUMMARY OF THE INVENTION

In accordance with an aspect of the invention, there is provided a camera capable of recording, on a recording medium, image information and information related to a signal received by signal receiving means, in which, during a predetermined period of time after receiving a signal, the signal receiving means is inhibited from receiving information, so that the camera has the advantage of speedy shooting faculty.

The above and further aspects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
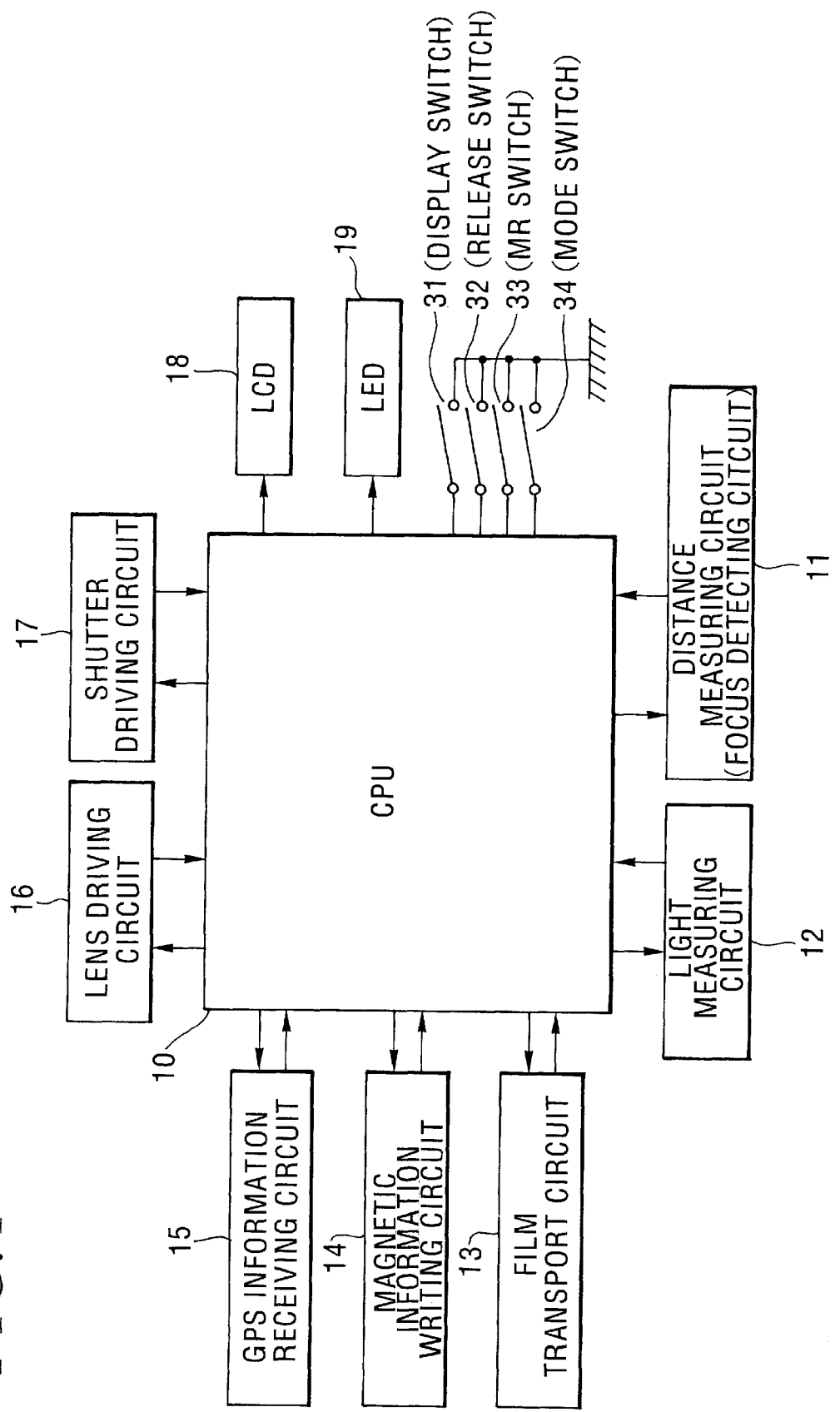
FIG. 1 is a block diagram showing the entire circuitry of an electric system of a camera according to each embodiment of the invention.

FIG. 1 is a block diagram showing the arrangement of an electric system of a camera according to a first embodiment of the invention.

Referring to FIG. 1, the electric system of the camera includes a CPU (central processing unit) 10 arranged to drive and control the entirety of the camera, a distance measuring circuit 11 arranged to measure a distance to an object to be photographed (or a focus detecting circuit arranged to detect a focusing state of the camera from an image of the object), a light measuring circuit 12 arranged to measure the luminance of the object, a film transport circuit 13 arranged to control driving of a film transport motor (not shown) so as to transport a film, serving as a recording medium, having a magnetic recording part, the film being loaded into the camera, a magnetic information writing circuit 14 arranged to control driving a magnetic head (not shown) so as to record magnetic information on the magnetic recording part of the film, a GPS (Global Positioning System) information receiving circuit 15 arranged to receive GPS information, and a lens driving circuit 16 arranged to set or reset a photographic lens on the basis of a distance measurement result provided by the distance measuring circuit 11.

The electric system of the camera further includes a shutter driving circuit 17 arranged to open and close a shutter for exposing the surface of the film to light, an LCD (liquid crystal display) 18 arranged to display a variety of pieces of information such as the number of film frame, an LED (light emitting diode) 19 arranged to give warning, a display switch 31 arranged to designate whether to display information on the LCD 18, a release switch 32 arranged to start a photo-taking operation, an MR (mid-roll interrupt) switch 33 arranged to be used for rewinding the film which is in a partially-used state, and a mode switch 34 arranged to set the photo-taking mode (single-shooting/continuous-shooting) of the camera. Each of the above switches 31, 32, 33 and 34 is assumed to be turned on by short-circuiting to the ground.

Figure 2:
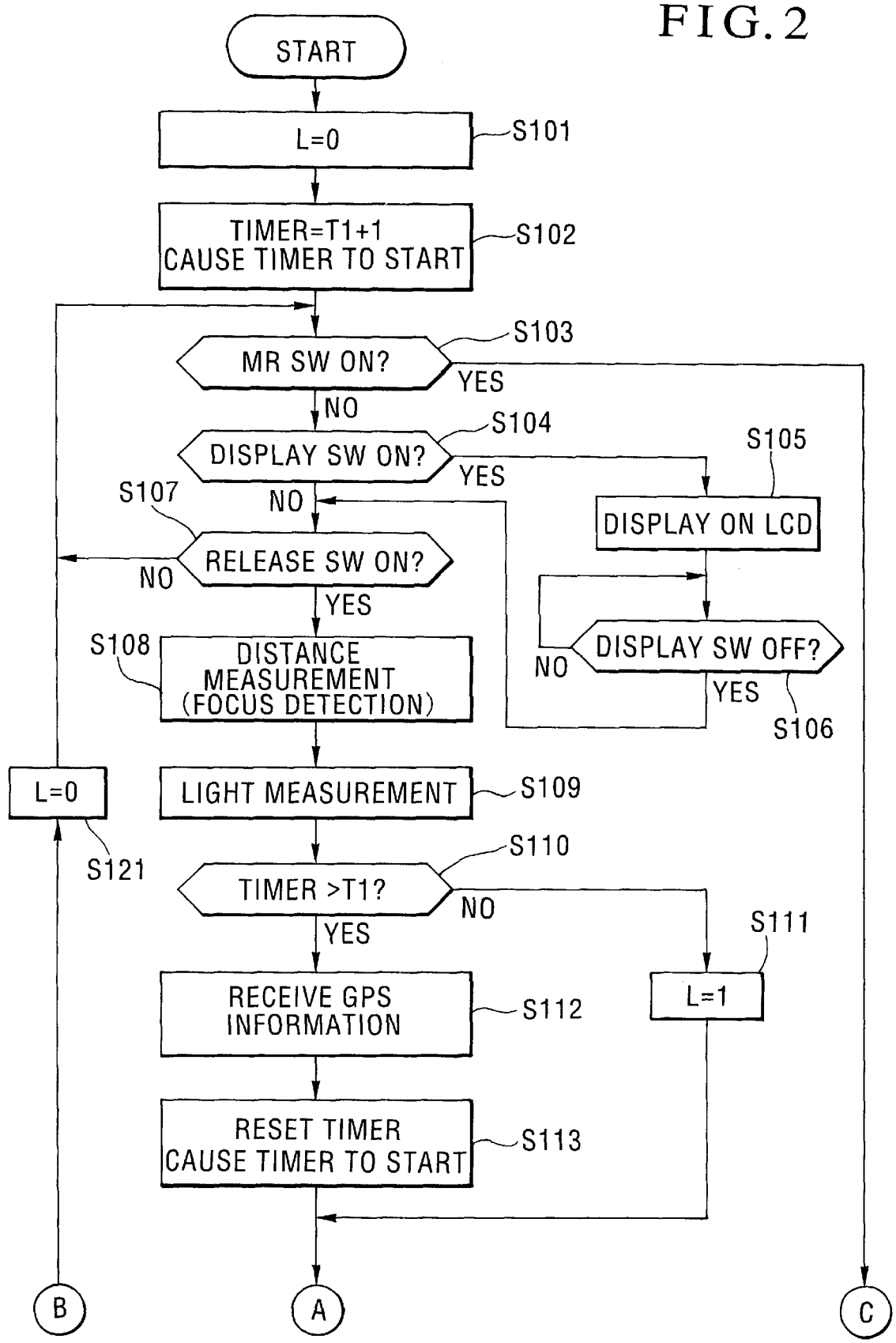
FIG. 2 is a flow chart showing a part of a series of operations of the camera according to a first embodiment of the invention.
Figure 3:
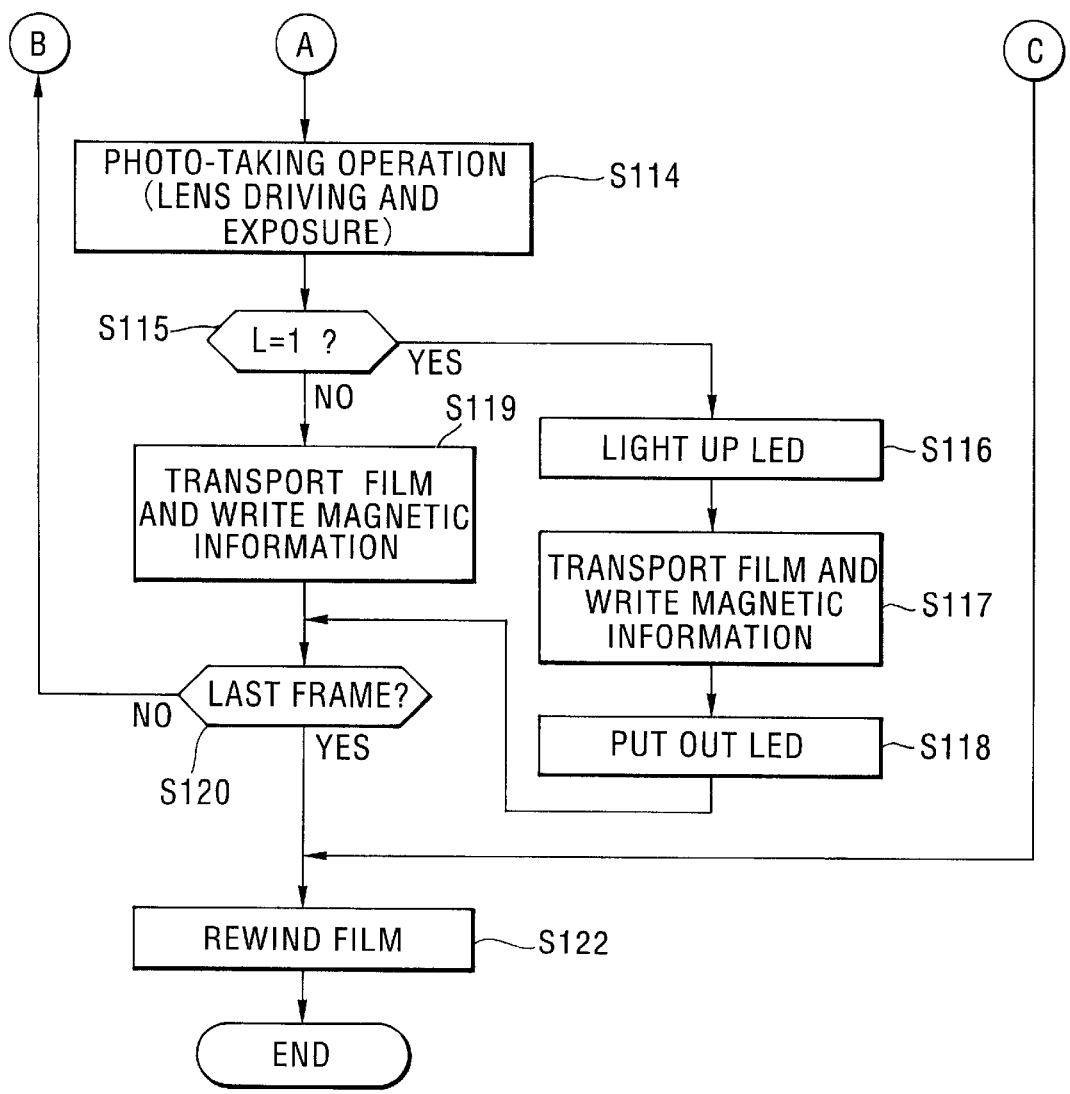
FIG. 3 is a flow chart showing the operation subsequent to the operation shown in the flow chart of FIG. 2.

FIGS. 2 and 3 are flow charts showing a series of operations of the camera having the above arrangement according to the first embodiment of the invention. The operations of the camera will be described below with reference to FIGS. 2 and 3.

First, in step S101, the CPU 10 sets, to "0", a flag L indicative of whether a predetermined period of time has elapsed from the preceding photo-taking operation (or from the preceding reception of GPS information). In the next step S102, the CPU 10 sets a count value of an internal timer thereof to "T1 (predetermined period of time)+1", and then causes the timer to start. The timer is arranged to be used for determining whether the predetermined period of time has elapsed from the preceding photo-taking operation (or from the preceding reception of GPS information), as will be further described later.

In the subsequent step S103, the CPU 10 determines whether the MR switch 33 arranged to forcedly rewind the film is turned on. If the MR switch 33 is turned on, the flow jumps to step S122 shown in FIG. 3, in which the film is made to be rewound. On the other hand, if the MR switch 33 is not turned on, the flow proceeds to step S104. In step S104, the CPU 10 determines whether the display switch 31 is turned on. If the display switch 31 is not turned on, the flow proceeds to step S107. If the display switch 31 is turned on, the flow proceeds to step S105. In step S105, the CPU 10 causes a number of the frame in which positioning information (measured-position information) is not yet recorded to be displayed on the LCD 18. In a case where there are plural frames in which positioning information is not yet recorded, the numbers of the frames may be displayed on the LCD 18 at intervals of a predetermined period of time in a time-serial manner. Then, the flow proceeds to step S106. In step S106, the CPU 10 determines whether the display switch 31 is turned off. If the display switch 31 is not turned off, the flow stays in step S106. If the display switch 31 is turned off, the flow proceeds to step S107.

In step S107, the CPU 10 determines whether the release switch 32 arranged to give an instruction for starting a photo-taking operation is turned on. If the release switch 32 is not turned on, the flow returns to step S103. If the release switch 32 is turned on, the flow proceeds to step S108. In step S108, the CPU 10 drives the distance measuring circuit (focus detecting circuit) 11 to perform a distance measuring (focus detecting) operation, thereby obtaining distance measurement (focus detection) information. In the subsequent step S109, the CPU 10 drives the light measuring circuit 12 to perform a light measuring operation, thereby obtaining light measurement information. Then, the flow proceeds to step S110. In step S110, the CPU 10 determines whether the predetermined period of time T1 (for example, one second) beforehand set in the internal timer of the CPU 10 has elapsed. If the predetermined period of time T1 has not yet elapsed, the flow proceeds to step S111. In step S111, the flag L is set to "1", and the flow proceeds to step S114 shown in FIG. 3 without receiving GPS information.

On the other hand, if it is determined in step S110 that the predetermined period of time T1 beforehand set in the internal timer of the CPU 10 has elapsed, the flow proceeds to step S112. In step S112, the CPU 10 receives GPS information through the GPS information receiving circuit 15. In the next step S113, the CPU 10 resets a count value of the internal timer to "0", and then causes the timer to start again. Then, the flow proceeds to step S114 shown in FIG. 3.

In step S114, the CPU 10 drives the lens driving circuit 16 and the shutter driving circuit 17 on the basis of the distance measurement (focus detection) information and the light measurement information obtained in the above steps S108 and S109 to perform setting of the photographic lens, opening and closing of the shutter (exposure) and resetting of the photographic lens, and the flow proceeds to step S115.

Here, the operations in the above steps S110 to S113 are described more concretely. It is determined whether the predetermined period of time T1 has elapsed from the preceding photo-taking operation (or from the preceding reception of GPS information) (S110). If the predetermined period of time T1 has elapsed, GPS information is received (S112). If the predetermined period of time T1 has not yet elapsed, the flag L is set to "1" indicating that the predetermined period of time T1 has not yet elapsed (S111). However, when the flow passes through the above step S110 for the first time, GPS information is necessarily received in step S112, because, in the above step S102, a count value of the internal timer of the CPU 10 is set to "T1 (predetermined period of time)+1" before starting of the timer.

In the next step S115, the CPU 10 checks for the state of the flag L to determine whether the predetermined period of time T1 has elapsed from the preceding photo-taking operation (or from the preceding reception of GPS information). If the predetermined period of time T1 has not yet elapsed (if L=1), the flow proceeds to step S116. In step S116, the CPU 10 causes the LED 19 to light up so as to give warning that GPS information is not being received in the current photo-taking operation. In the subsequent step S117, the CPU 10 drives the film transport circuit 13 to transport the film and, at the same time, records photo-taking information, GPS information received for the last time, etc., on the magnetic recording part of the film through the magnetic information writing circuit 14. After the film transport and the magnetic recording are completed, the flow proceeds to step S118. In step S118, the LED 19 is put out, and the flow proceeds to step S120.

On the other hand, if, in the above step S115, the predetermined period of time T1 has elapsed from the preceding photo-taking operation (or from the preceding reception of GPS information)(if L=0), the flow proceeds to step S119. In step S119, similarly to the above step S117, the CPU 10 drives the film transport circuit 13 to transport the film and, at the same time, records photo-taking information, GPS information received for the last time, etc., on the magnetic recording part of the film through the magnetic information writing circuit 14. After the film transport and the magnetic recording are completed, the flow proceeds to step S120. Incidentally, the above film transport and magnetic recording are assumed to be performed in a known method.

Here, the GPS information received for the last time mentioned in the above step S117 means GPS information received in a frame preceding the frame used for the current photo-taking operation. The GPS information received for the last time mentioned in the above step S119 means GPS information received in the frame used for the current photo-taking operation. In consequence, when an interval in photo-taking operation between the preceding frame and the current frame is short (for example, at the time of continuous shooting), the last information is recorded without receiving GPS information. On the other hand, when an interval in photo-taking operation between the preceding frame and the current frame is long (for example, at the time of single shooting), GPS information is received before magnetic recording and the received GPS information is recorded.

In the step S120, the CPU 10 determines whether the film has been exposed up to the last frame. If the film has not yet been exposed up to the last frame, the flow proceeds to step S121 shown in FIG. 2. In step S121, the flag L is reset to "0", and the flow returns to step S103. On the other hand, if it is determined in step S120 that the film has been exposed up to the last frame, the flow proceeds step S122. In step S122, the CPU 10 drives the film transport circuit 13 to rewind the film, and, then, the series of operations is ended.

In the above-described first embodiment, photo-taking information, GPS information received for the last time, etc., are magnetically recorded on the magnetic recording part of the film in each of steps S117 and S119. However, such another recording method may be taken that a state of the flag L is recorded to indicate in which frame the GPS information recorded in an applicable frame was received. It goes without saying that the state of the flag L may be recorded only in step S117 or only in step S119. In addition, in step S117, such an arrangement as not to write the magnetic information may be taken.

Further, the operations in steps S110 to S113 may be performed after the photo-taking operation in step S114.

In addition, in the first embodiment, GPS information is received in step S112. However, information to be received in step S112 is not limited to the GPS information, and may be local area information transferred from a personal computer (external CPU), or the like.

Further, while the first embodiment has been described by using, as an example, a camera arranged to use a film having a magnetic recording part as a recording medium, the invention is not limited to the example and may be applied to the so-called digital camera which records and reproduces image information, etc., in a recording medium such as a memory.

Figure 4:
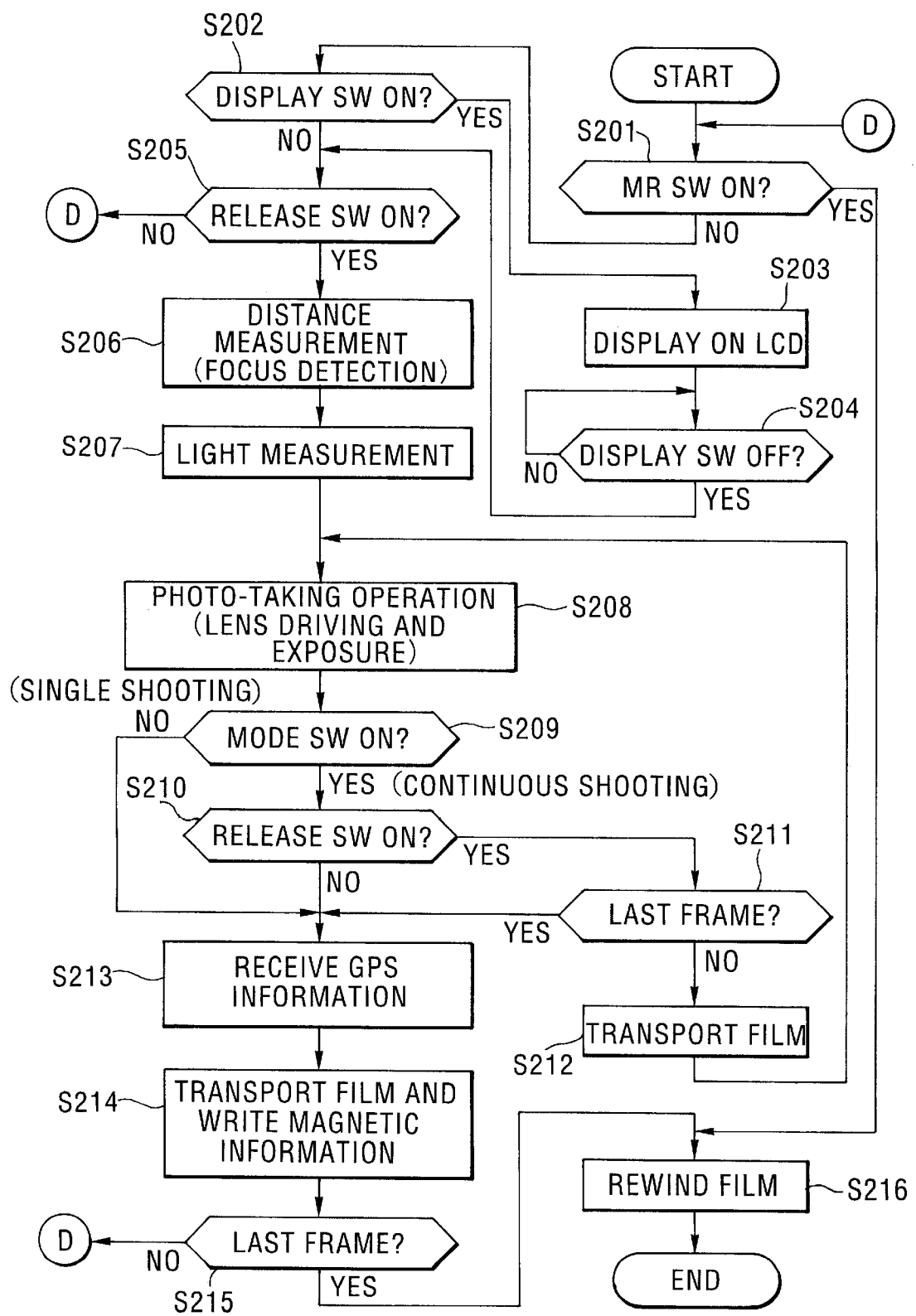
FIG. 4 is a flow chart showing a series of operations of the camera according to a second embodiment of the invention.

FIG. 4 is a flow chart showing a series of operations of a camera according to a second embodiment of the invention. The arrangement of an electric system of the camera is the same as that shown in FIG. 1, and the details thereof are omitted from the following description.

First, in step S201, the CPU 10 determines whether the MR switch 33 arranged to forcedly rewind the film is turned on. If the MR switch 33 is turned on, the flow jumps to step S216, in which the film is made to be rewound. On the other hand, if the MR switch 33 is not turned on, the flow proceeds to step S202. In step S202, the CPU 10 determines whether the display switch 31 is turned on. If the display switch 31 is not turned on, the flow proceeds to step S205. If the display switch 31 is turned on, the flow proceeds to step S203. In step S203, the CPU 10 causes a number of the frame in which positioning information (measured-position information) is not yet recorded to be displayed on the LCD 18. In a case where there are plural frames in which positioning information is not yet recorded, the numbers of the frames may be displayed on the LCD 18 at intervals of a predetermined period of time in a time-serial manner. Then, the flow proceeds to step S204. In step S204, the CPU 10 determines whether the display switch 31 is turned off. If the display switch 31 is not turned off, the flow stays in step S204. If the display switch 31 is turned off, the flow proceeds to step S205.

In step S205, the CPU 10 determines whether the release switch 32 arranged to give an instruction for starting a photo-taking operation is turned on. If the release switch 32 is not turned on, the flow returns to step S201. If the release switch 32 is turned on, the flow proceeds to step S206. In step S206, the CPU 10 drives the distance measuring circuit (focus detecting circuit) 11 to perform a distance measuring (focus detecting) operation, thereby obtaining distance measurement (focus detection) information. In the subsequent step S207, the CPU 10 drives the light measuring circuit 12 to perform a light measuring operation, thereby obtaining light measurement information. Then, the flow proceeds to step S208. In step S208, the CPU 10 drives the lens driving circuit 16 and the shutter driving circuit 17 on the basis of the distance measurement (focus detection) information and the light measurement information obtained in the above steps S206 and S207 to perform setting of the photographic lens, opening and closing of the shutter (exposure) and resetting of the photographic lens, and the flow proceeds to step S209.

In step S209, the CPU 10 determines whether the mode switch 34 is turned on so as to determine whether the photo-taking mode of the camera is set to the continuous shooting mode or the single shooting mode. If the mode switch 34 is not turned on, i.e., in the case of the single shooting mode, the flow proceeds directly to step S213. If the mode switch 34 is turned on, i.e., in the case of the continuous shooting mode, the flow proceeds to step S210. In step S210, the CPU 10 determines whether the release switch 32 is turned on. If the release switch 32 is turned on, it is considered that the continuous shooting operation still continues, so that the flow proceeds to step S211. In step S211, the CPU 10 determines whether the frame exposed immediately before is the last frame of the film. If the frame exposed immediately before is the last frame of the film, the flow proceeds to step S213. If not, the flow proceeds to step S212. In step S212, the CPU 10 drives the film transport circuit 13 to perform only transporting of the film for the next frame. Then, the flow returns to step S208 to perform the photo-taking operation for the next frame.

If it is determined in the above step S210 that the release switch 32 is not turned on, it is considered that the continuous shooting operation is discontinued or ended, so that the flow proceeds to step S213. In step S213, the CPU 10 receives GPS information through the GPS information receiving circuit 15. In the subsequent step S214, the CPU 10 drives the film transport circuit 13 to transport the film and, at the same time, records photo-taking information, GPS information received for the last time, etc., on the magnetic recording part of the film through the magnetic information writing circuit 14.

Here, the operations in the above steps S208 to S214 are described more concretely. After the completion of the photo-taking operation (S208), in the case of the single shooting mode, since the subsequent operations need not be quickly performed, the GPS information is made to be received (S213), and, then, the transportation of the film and the recording of the magnetic information are performed (S214). On the other hand, after the photo-taking operation (S208), in the case of the continuous shooting mode, a determination is first made on the basis of the state of the release switch 32 as to whether the continuous shooting operation still continues (S210). If the continuous shooting operation does not continue (if the release switch 32 is turned off), since the subsequent operations need not be quickly performed, the GPS information is made to be received (S213), and, then, the transportation of the film and the recording of the magnetic information are performed (S214).

Further, if it is determined in step S210 that the continuous shooting operation continues (if the release switch 32 is turned on), a determination is made as to whether the frame exposed immediately before is the last frame of the film (S211). If it is the last frame, since the film is no longer usable for the photo-taking operation and the subsequent operations need not be quickly performed, the GPS information is made to be received (S213), and, then, the transportation of the film and the recording of the magnetic information are performed (S214). If the continuous shooting operation continues and the frame exposed immediately before is not the last frame, i.e., if the flow proceeds to step S212, the subsequent operations need be quickly performed. Accordingly, without receiving GPS information and without recording magnetic information, only the transportation of the film is performed (S212), and, then, the photo-taking operation for the next frame is performed in step S208.

After the transportation of the film and the recording of magnetic information are completed in the above step S214, the flow proceeds to step S215. In step S215, the CPU 10 determines whether the film has been exposed up to the last frame. If the film has not yet been exposed up to the last frame, the flow returns to step S201. On the other hand, if it is determined in step S215 that the film has been exposed up to the last frame, the flow proceeds step S216. In step S216, the CPU 10 drives the film transport circuit 13 to rewind the film, and, then, the series of operations is ended.

In the above-described second embodiment, in the case of the continuous shooting mode, GPS information is made to be received only when the continuance of the continuous shooting operation is cancelled, i.e., only immediately before the film is transported for the last frame of the continuous shooting operation, and magnetic information is made to be recorded only in the last frame of the continuous shooting operation. However, the invention is not limited to such an arrangement, and may be modified to have an arrangement for recording magnetic information such as the frame number of the continuous shooting operation even in a frame which is subjected to the continuous shooting operation and for which GPS information is not received.

In addition, while, in the second embodiment, GPS information is received in step S213, the operation to be performed in step S213 is not limited to the reception of GPS information, and includes all such operations as to lower the continuous shooting faculty (frame speed), for example, the operation for receiving local area information transferred from a personal computer (external CPU).

Further, as in the steps S104 to S106 mentioned in the above-described first embodiment, the number of a frame in which magnetic information is not recorded may be displayed by turning on the display switch 31, or as in the steps S115 to S118 mentioned in the above-described first embodiment, the LED 19 may be light up when magnetic information is not being written.

Further, while the send embodiment, too, has been described by using, as an example, a camera arranged to use a film having a magnetic recording part as a recording medium, the invention is not limited to the example and may be applied to the so-called digital camera which records and reproduces image information, etc., in a recording medium such as a memory.

Here, the advantages of the first and second embodiments of the invention are described collectively.

i) Since the receiving operation for GPS information is inhibited during a period of time from the preceding photo-taking operation or from the preceding reception of GPS information (steps S110 and S111 shown in FIG. 2), the camera can be quickly shifted to the photo-taking operation for the next frame and can save wasteful electric power consumption by performing no wasteful receiving operation.

ii) Since, during a period of time from the preceding photo-taking operation or from the preceding reception of GPS information, GPS information received immediately before is made to be recorded on the film (step S117 shown in FIG. 3), it becomes possible to record relatively high-precision GPS information (because there is little possibility that the camera is moved far away in a short period of time) while attaining electric power saving without lowering the continuous shooting faculty.

iii) Since, during a period of time from the preceding photo-taking operation or from the preceding reception of GPS information, GPS information received immediately before is made to be recorded on the film, GPS information lacking in accuracy is prevented from being recorded.

iv) Since, in a case where the next photo-taking operation is performed within a predetermined period of time from the preceding reception of GPS information (in the case of the continuous shooting mode), warning of the fact is given by using the LED 16 (step S116), the photographer can readily know that magnetically-recorded information for a frame subjected to the photo-taking operation is different from the ordinary information.

v) Since, in a case where the next photo-taking operation has been performed within a predetermined period of time from the preceding reception of GPS information (in the case of the continuous shooting mode), a frame number subjected to the photo-taking operation is made displayable, the photographer can find magnetic information of which frame number is different from the ordinary information.

vi) Since information to be recorded on the film is made to differ according to the selection of the continuous shooting mode and the single shooting mode (steps S208 to S214 shown in FIG. 4), the latest GPS information can be surely recorded on the film in the single shooting mode and for the last frame of the continuous shooting operation. Further, the continuous shooting operation (except for the last frame thereof) can continue without sacrificing the continuous shooting faculty, and electric power saving can be attained.

As described above, according to each of the embodiments, it is possible to provide a camera capable of continuing the shooting operation without sacrificing the quick shooting faculty and without consuming wasteful electric power.

Further, it is possible to provide a camera capable of recording relatively high-precision GPS information while attaining electric power saving without lowering the quick shooting faculty.

Further, it is possible to provide a camera capable of preventing GPS information lacking in accuracy from being recorded, while attaining electric power saving without lowering the quick shooting faculty.

Further, it is possible to provide a camera capable of giving information that information recorded in an applicable frame is different from information recorded in the ordinary frame.

Further, it is possible to provide a camera capable of making it easily findable information of which frame is different from information recorded in the ordinary frame.

Further, it is possible to provide a camera capable of recording GPS information required as much as possible, while attaining electric power saving without lowering the continuous shooting faculty.

What is claimed is:

1. A camera comprising:
   a receiving device capable of receiving a signal externally transferred;
   a recording device for recording, on a recording medium, information related to a signal received by said receiving device;

a timer circuit which measures a predetermined period from a reception by said receiving device of the signal; and a control circuit which prohibits a receiving operation of said receiving device and performs a photographing operation by said camera until the predetermined period is measured by said timer circuit, said control circuit, after the predetermined period is measured by said timer circuit, performs the receiving operation of said receiving device, and thereafter, performs the photographing operation by said camera.

2. A camera according to claim 1, wherein, when a subsequent photo-taking operation is performed within the predetermined period, said control circuit causes said recording device to record, on the recording medium, information related to a signal received immediately before.

3. A camera according to claim 1, further comprising:

a warning device which gives a warning when a subsequent photo-taking operation is performed within the predetermined period.

4. A camera according to claim 2, further comprising:

a display device capable of, when a subsequent photo-taking operation has been performed within the predetermined period, displaying a frame number related to the subsequent photo-taking operation.

5. A camera according to claim 1, wherein the signal externally transferred is a signal related to a Global Positioning System.

6. A camera comprising:

a receiving device capable of receiving a signal externally transferred;

a recording device for recording an image on the recording medium and for recording, on the recording medium, information related to the signal received by said receiving device;

a timer circuit which measures a predetermined period from a reception by said receiving device of the signal; and a control circuit which prohibits a receiving operation of said receiving device and performs a photographing operation by said camera until the predetermined period is measured by said timer circuit, said control circuit, after the predetermined period is measured by said timer circuit, performs the receiving operation of said receiving device, and thereafter, performs the photographing operation of said camera.

7. A camera according to claim 6, wherein the signal externally transferred is a signal related to Global Positioning System.

* * * * *